United States Patent [19]

Katz

[11] Patent Number: 5,124,071
[45] Date of Patent: Jun. 23, 1992

[54] MICROSCOPIC PARTICLES CONTAINING IMBEDDED FLUORESCENT DYES AND USE THEREOF IN PARTICLE-IMAGE VELOCIMETRY

[76] Inventor: Joseph Katz, 130 Starhill La., Catonsville, Md. 21218

[21] Appl. No.: 585,789

[22] Filed: Sep. 20, 1990

[51] Int. Cl.⁵ .............................................. C09K 11/06
[52] U.S. Cl. .................................. 252/301.35; 8/509; 428/407; 428/402.24
[58] Field of Search .................. 252/301.35; 428/407, 428/402.24; 8/509

[56] References Cited

U.S. PATENT DOCUMENTS

| | | | |
|---|---|---|---|
| 3,734,872 | 5/1973 | Wakimoto | 252/301.35 |
| 3,919,110 | 11/1975 | Vasilliades | 8/526 |
| 4,264,330 | 4/1981 | Schmidt | 252/301.35 |
| 4,699,826 | 10/1987 | Schwartz | 252/301.35 |
| 4,846,893 | 7/1989 | Akasaki | 106/500 |
| 4,865,937 | 9/1989 | Santilli | 252/301.35 |
| 4,880,432 | 11/1989 | Egan | 8/509 |

OTHER PUBLICATIONS

"Organic Chemistry", Fieser & Fieser, pp. 904 and 905.
DCM, CAS No.: 51325-91-8, p. 51.
"Elvacite Acrylic Resins Properties and Uses", pp. 1–33.

Primary Examiner—Prince Willis, Jr.
Assistant Examiner—Thomas Steinberg
Attorney, Agent, or Firm—Cushman, Darby & Cushman

[57] ABSTRACT

Microscopic, neutrally buoyant particles containing fluorescing compounds used for tracers of large scale turbulent flows. The particles are generated by dissolving acrylics in a solvent and mixing the solution with fluorescing dyes. This mixture is sprayed into a heated chamber where the solvent evaporates, and the solid acrylic with the imbedded dye settles on the bottom of the chamber. The dust is collected, and the particles are separated according to size using a filter. Dye residue on the particles' surface is washed leaving the dye imbedded within the particles. The particles are then used within flow fields.

8 Claims, 2 Drawing Sheets

MICROSCOPIC PARTICLES CONTAINING IMBEDDED FLUORESCENT DYES AND USE THEREOF IN PARTICLE-IMAGE VELOCIMETRY

This invention was made with Government support from the Office of Naval Research. The Government has certain rights in this invention.

BACKGROUND OF THE INVENTION

1. Field of the Invention:

The present invention relates to particles, and their method of production, for use in particle-image velocimetry.

2. Description of the Related Art

It is known in the art to utilize single-point fluid flow velocity measurement techniques such as hot wire anemometry, laser doppler anemometry and the pitot tube to find the velocity only at a specific point. This makes flow analysis difficult in that flow structures are hard to clearly identify, and therefore it is arduous to obtain an overview of the flow since data interpretation is quite hard.

A possible solution is to make single point measurements at many different points in the flow field. However problems arise in data analysis. Due to the cost of laser doppler anemometry, it is nearly impossible to acquire point measurements at more than a few points. Hence, there is much room for interpretive analysis of the data in which the results are largely based on "educated guessing". Further, with all single point measuring techniques other than laser doppler anemometry, the methods alter the flow that they are intended to measure.

Another known method to measure flow velocity is to perform quantitative flow visualization, i.e. performing measurements over the entire field. In prior methods, particles that are reflective have been relied upon. The reflected intensity was usually weak and it was difficult to photograph the trails of the particles. To attack this problem, it was necessary to utilize a more intense laser beam and/or larger particles to strengthen the reflected light.

However, it is desirable to use as small a particle as possible and as weak a laser. A weak laser is desirable due to safety and cost considerations. The particles should be smaller than any scale of turbulence so as not to alter the flow and yet be detectable and be capable of photographic recordation. If the particles are larger than any significant turbulence scale, different portion of the same particle are exposed to different velocities. Further, too large a particle will tend to alter the flow it was intended to measure. The particles must also be neutrally buoyant, otherwise they will move relative to the fluid as a result of gravity and/or pressure gradients.

Hence, it was necessary to develop particles that were small and used a different tracing method than light reflection.

SUMMARY OF THE INVENTION

The present invention utilizes a seeding particle with a fluorescent dye imbedded therein to produce a brighter trace that is more easily recorded. The particles are generated by dissolving acrylics in a solvent, such as Ethylene Dichloride and mixing the solution with fluorescing dyes, such as Rhodamines, Di-Chloro Fluorescein, DCM or 4-(Dicyanomethylene)-2-methyl-6-(p-dimethylaminostyryl)-4-pyran, etc. The mixture is then atomized into a heated chamber where the solvent evaporates, and the solid acrylic with the imbedded dye settles on the bottom of the chamber. The dust is collected, and by utilizing a filter, the dust is separated according to their size. Dye residue on the surface of the particles is then washed, leaving only the dye imbedded within the particles.

The basic assumption in the particle tracing method according to the present invention is that the particle motion accurately represents the fluid motion.

In general, it is important that the particles be as close as possible to being neutrally buoyant and small in diameter so that their velocity is close to the fluid's velocity. Particles as small as 0.5 to 10 μm are detectable, however the optimum particle diameter may be taken to be the largest that follows the flow. Optimum particle size is about 10 to 30 μm.

BRIEF DESCRIPTION OF THE DRAWING

Other objects, features and characteristics of the present invention, as well as methods of operation and functions of the related elements of the structure, and to the combination of part and economies of manufacture, will become apparent upon consideration of the following description and the appended claims with reference to the accompanying figures, all of which form a part of this specification, wherein like reference numerals designate corresponding parts in the various figures, wherein:

DETAILED DESCRIPTION OF THE PRESENTLY PREFERRED EXEMPLARY EMBODIMENT

The fluorescent particles according to the present invention were made out of acrylics dissolved in a solvent and then mixed with fluorescing dyes.

One type of acrylic resin worked best for development of the fluorescent particles. The type of acrylic resin used was Methacrylate. The resin has a crystalline structure and is classified into grades depending upon crystal size and geometry. The preferred grade of Methacrylate was No. 2008. This grade of methacrylate has a density of 1,196 kg resin/m$^3$, a specific gravity of 120 at 25° C. and an inherent viscosity of 0.18. The grains become finer as the number increases. By combining several acrylics, some with specific gravity larger than 1.00 and some lighter than water, it is possible to obtain particles which are neutrally buoyant.

The different solvents used were Ethylene Dichloride, 1,1,1 Trichloroethane and combinations of the above in different volumetric proportions.

Of course, the acrylics and solvents that can be used are not restricted to those recited above, but rather they may be selected from a broad range as long as satisfactory particles are formed. The parameters utilized in the present embodiment, including temperature, atomizing pressure, etc. can be easily varied to suit the materials being used.

The fluorescent dyes utilized were Rhodamine 6G, Rhodamine B, DCM, 2,7 Dichlorofluorescein, Fluorescein and different combinations of the above dyes.

Figure 1:
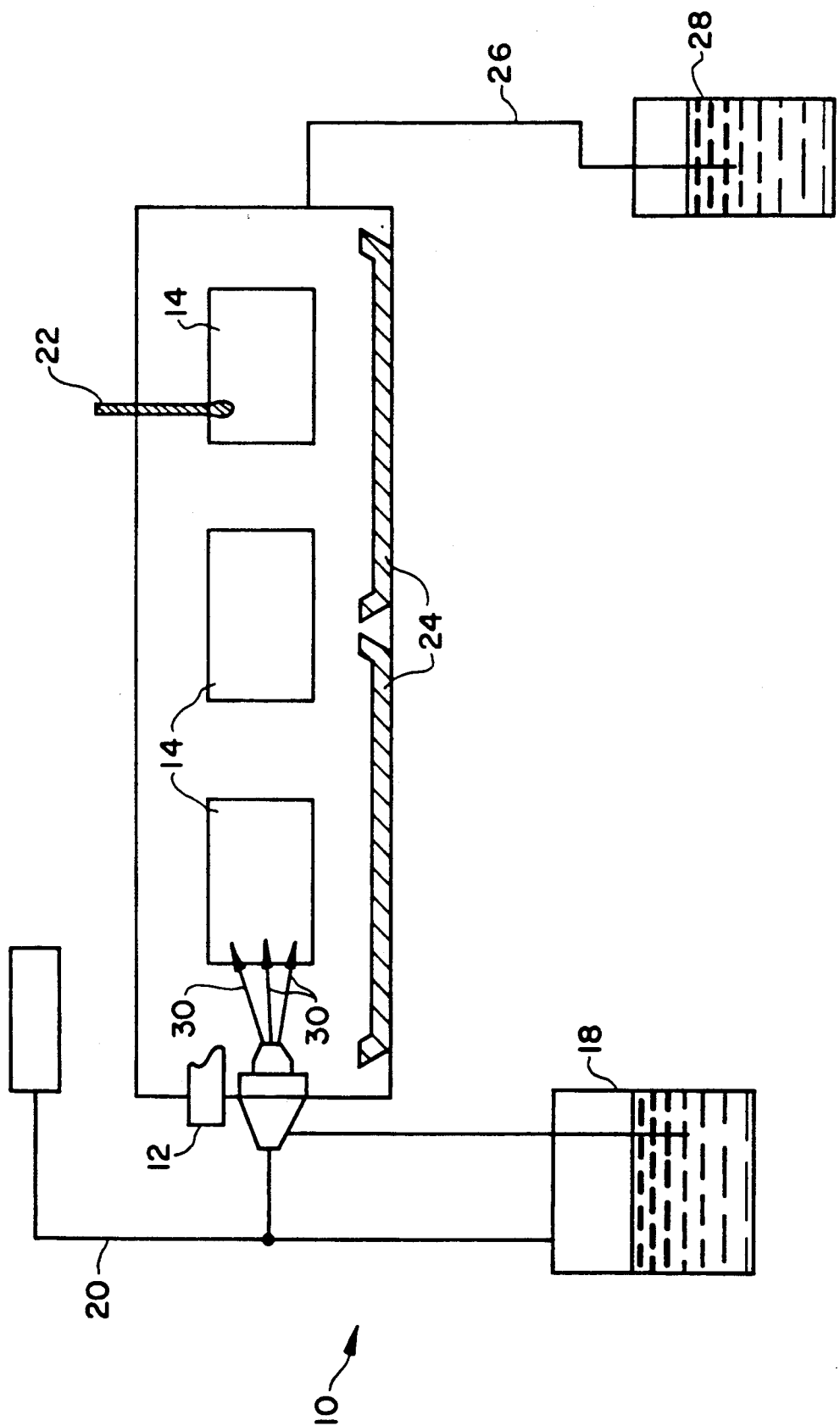
FIG. 1 is a schematic diagram of the particle generation chamber for generation of particles according to the present invention.
Figure 2:
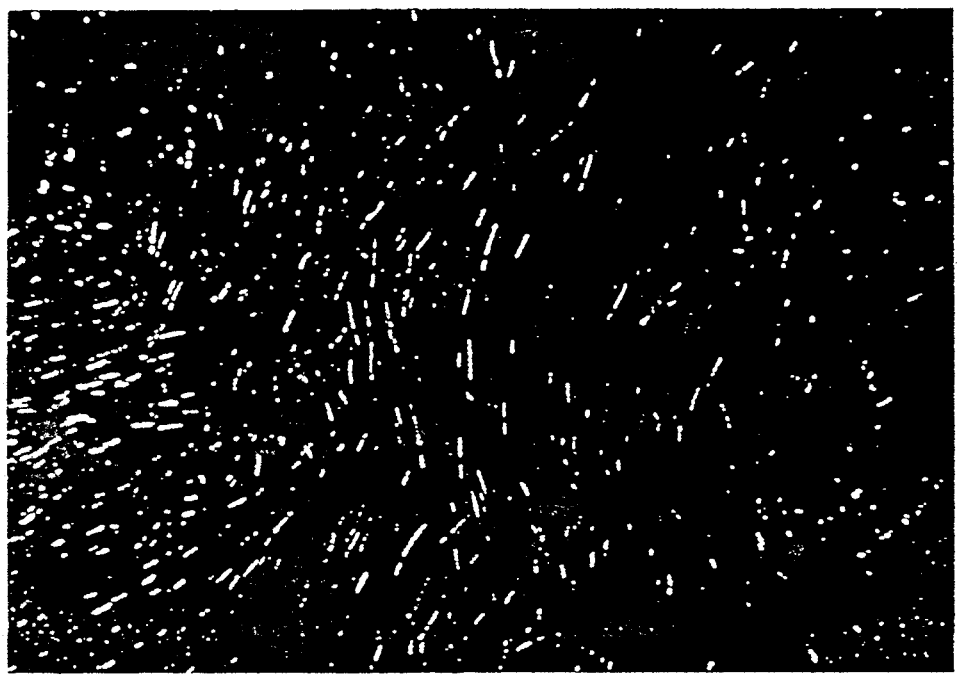
FIG. 2 is an example of the particle traces detected using the particles according to the present invention.

The particles according to the present invention are produced in a particle generation chamber shown generally as 10 in FIG. 1. Such a chamber is a 9 ft ±3 ft ±2 ft wooden sealed box with glass windows 14. The chamber has two convection heaters 12 with blowers fixed to its sides. Chamber temperature may be controlled by adjusting blower speed and the output speed of the heater. A paint spray gun 16 is fixed to one side of the chamber. The material is injected through a small nozzle with gas crossflow that thus breaks the jet into small droplets and atomizes it. The material is injected from transfer pot 18 that is pressurized by a source of high pressure air 20. Thermometers 22 monitor the temperature within the chamber.

Two metal sheet trays 24 sit on the floor of chamber 10. When the solution is sprayed, it forms a fine mist as it is constantly atomized by high pressure air. The mist dries in chamber 10 and dust particles form that settle into trays 24. The pressure is maintained slightly above the atmospheric level and excess air is released through pipes 26 located at the other side of the facility. The pipes 26 are inserted in a water-filled venting tank 28 so that the particles remain suspended in water and are not released to the atmosphere. After completion of spraying, the fluorescent particles that settle in trays 24 are collected.

In another embodiment of the generation chamber (not shown), water injectors spray water on the powder after it is dry. The powder/water mixture is collected through a pipe located at the bottom of the tank.

To form the material to be sprayed, the acrylic is added to the solvent and the solution is stirred until all of the acrylic dissolves. Powderized dye is then stirred into the solution to ensure uniform dispersion of the dye.

Once the correct solution is prepared, it is kept immersed in a hot water bath at temperatures ranging from 60° to 70° C. in air-tight bottles and then transferred to solution transfer pot 18 of chamber 10. Air injected into pot 18 from high pressure air source 20 forces the solution from pot 18 to spray gun 16. The atomizing air flowing through the spray gun atomizes the solution into tiny droplets that are ejected into the air tight section of chamber 10. Such a spray is indicated by arrows 30. The temperature in the chamber is maintained at a temperature higher than the boiling point of the solvent used to dissolve the acrylic. Thus, the microscopic solution droplets are injected into an environment with a temperature higher than their boiling point and the solvent contained therein evaporates leaving behind the particles with the fluorescing dye embedded therein. These particles settle in collection trays 24.

The particles are then collected from the tray and are thoroughly washed in water to remove any dye that may be loosely adhered to the particles' surfaces. This is done by immersing the particles in water and then filtering the particles with a paper filter or other types of filters. The washed particles are then air-dried. The resulting particles are substantially spherical.

The main control parameters for size, shape, fluorescence and quantity of the particles produced using this process are concentration by weight of the acrylic in a given volume of solvent, amount of dye (in teaspoons) added to a given amount of the solution, the transfer rate of the solution from transfer pot 18 to spray gun 16 and the temperature maintained within the chamber by heaters 12.

Experiment has shown that not all acrylics and solvents are useful in terms of particle production. There are three main reasons for failure of the solvent. One reason is that the acrylic(s) used were not sufficiently soluble in the solvent being used. Another reason for failure was that the acrylic formed lumps of a thick mushy nature when added to the solvent. Thus, no solution could be prepared suitable for spraying into the chamber. The third and main reason for failure of the solvents is that they may not be sufficiently volatile and do not evaporate quickly after spraying and thus not allowing the dust to settle. Consequently, evaporation of the solvent is slow and particle generation can not be effectively conducted. Rather than trays 24 having particles settling therein, a liquid layer forms due to the solvents prolonged evaporation time.

Certain acrylics are not suitable since they form long threads rather than small droplets when sprayed into the chamber and deposited in trays 24.

The dyes used in the present embodiment are important in determining the color and the brightness of the particle traces, thereby effecting the eventual photographic results of the flow patterns. The dyes used are fluorescing in nature, meaning that absorb energy at one wavelength and emit this energy at a higher wavelength. For each particular dye, there are definite wavelength at which absorption and emission are maximized. Thus, although dyes utilized in the present embodiment were described above, dyes should be selected so as to maximize energy absorption and hence emission (fluorescence) when they are used with a certain laser. FIG. 2 illustrate the type of trace that the particles can provide.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Microscopic particles for use in velocimetry of turbulent flows, comprising:
   an acrylic resin; and
   a fluorscent dye imbedded within said acrylic resin;
   wherein said microscopic particles are substantially spherical, neutrally buoyant and solid; and
   wherein said dye is uniformly dispersed within said particles.

2. Microscopic particles as claimed in claim 1, wherein said microscopic particles have a diameter at least 0.5 μm.

3. Microscopic particles as claimed in claim 2, wherein said microscopic particles have a diameter in the range of from 10 μm to 30 μm.

4. Microscopic particles as claimed in claim 3, wherein said dye is selected from the group consisting of Rhodamine 6G, Rhodamine B, DCM 4-(Dicyanomethylene)-2-methyl-6-(p-dimethylaminostyryl)-4H-pyran 2,7 Dichlorofluorescein, Fluorescein and combination thereof.

5. Microscopic particles as claimed in claim 1, wherein said acrylic resin is made from Methacrylate.

6. Microscopic particles as claimed in claim 5 wherein a grade of Methacrylate used was 2008 and wherein the Methacrylate has a density of 1,196 kg resin/$m^3$, a specific gravity of 1.20 at 25° C. and an inherent viscosity of 0.18.

7. Microscopic particles for use in velocimetry of turbulent flows, comprising:

an acrylic resin; and a fluorescent dye imbedded within said acrylic resin;

wherein said resin is Methacrylate 2008 and has a density of 1,196 kg resin/m$^3$, a specific gravity of 1.20 at 25° C. and an inherent viscosity of 0.18;

wherein said particles have a diameter between 10 $\mu$m and 30 $\mu$m; and wherein said particles are solid and substantially neutrally buoyant in water.

8. Microscopic particles for use in velocimetry of turbulent flows, as claimed in claim 7:

wherein said dye is chosen from the group consisting of Rhodamine 6G, Rhodmaine B, 4-(Dicyanomethylene)-2-methyl-6-(p-dimethylaminostyryl)-4H-pyran, 2,7 Dichlorofluorescein, Fluorescein, and combination thereof.

* * * * *